(12) United States Patent
Veit

(10) Patent No.: US 9,010,506 B2
(45) Date of Patent: Apr. 21, 2015

(54) VIBRATION ABSORBER FOR DAMPING MECHANICAL VIBRATIONS

(76) Inventor: Günther Veit, Bingen (DE)

( * ) Notice: Subject to any disclaimer, the term of this patent is extended or adjusted under 35 U.S.C. 154(b) by 291 days.

(21) Appl. No.: 13/813,080

(22) PCT Filed: Jul. 29, 2011

(86) PCT No.: PCT/EP2011/063087
§ 371 (c)(1),
(2), (4) Date: May 10, 2013

(87) PCT Pub. No.: WO2012/013775
PCT Pub. Date: Feb. 2, 2012

(65) Prior Publication Data
US 2013/0220752 A1 Aug. 29, 2013

(30) Foreign Application Priority Data
Jul. 30, 2010 (DE) .......................... 10 2010 038 720

(51) Int. Cl.
*F16F 7/10* (2006.01)
*E04B 1/98* (2006.01)

(52) U.S. Cl.
CPC .. *E04B 1/985* (2013.01); *F16F 7/10* (2013.01)

(58) Field of Classification Search
USPC ...................... 188/378, 268; 267/136, 140, 66
See application file for complete search history.

(56) References Cited

U.S. PATENT DOCUMENTS

| 2,272,639 A | 2/1942 | Jack |
| 3,078,969 A | 2/1963 | Campbell et al. |

FOREIGN PATENT DOCUMENTS

| DE | 21 63 798 C2 | 7/1973 |
| DE | 43 43 008 C1 | 1/1995 |
| DE | 10 2006 031 830 A1 | 1/2008 |
| EP | 1 783 366 A1 | 5/2007 |
| EP | 1 852 630 A1 | 11/2007 |

OTHER PUBLICATIONS

International Search Report corresponding to PCT Application No. PCT/EP2011/063087, mailed Nov. 2, 2011, (German and English language document) (4 pages).

*Primary Examiner* — Melanie Torres Williams
(74) *Attorney, Agent, or Firm* — Maginot, Moore & Beck, LLP

(57) ABSTRACT

The invention relates to a vibration absorber for damping mechanical vibrations of a structure capable of vibration at least in some portions. The vibration absorber comprises at least two rod-shaped vibrating elements, which each have a longitudinal axis, and a support module. The support module comprises at least two non-parallel support plates and an attachment device. In this case, for the purpose of attaching the vibration absorber to the structure, the attachment device is constructed in such a way that mechanical vibrations of the structure can be passed into at least a first of the support plates. The support plates are interconnected in such a way that the mechanical vibrations can be transferred from the first support plate to a second of the support plates. A first vibrating element is coupled at a first position along the longitudinal axis of the first vibrating element to the first support plate.

16 Claims, 7 Drawing Sheets

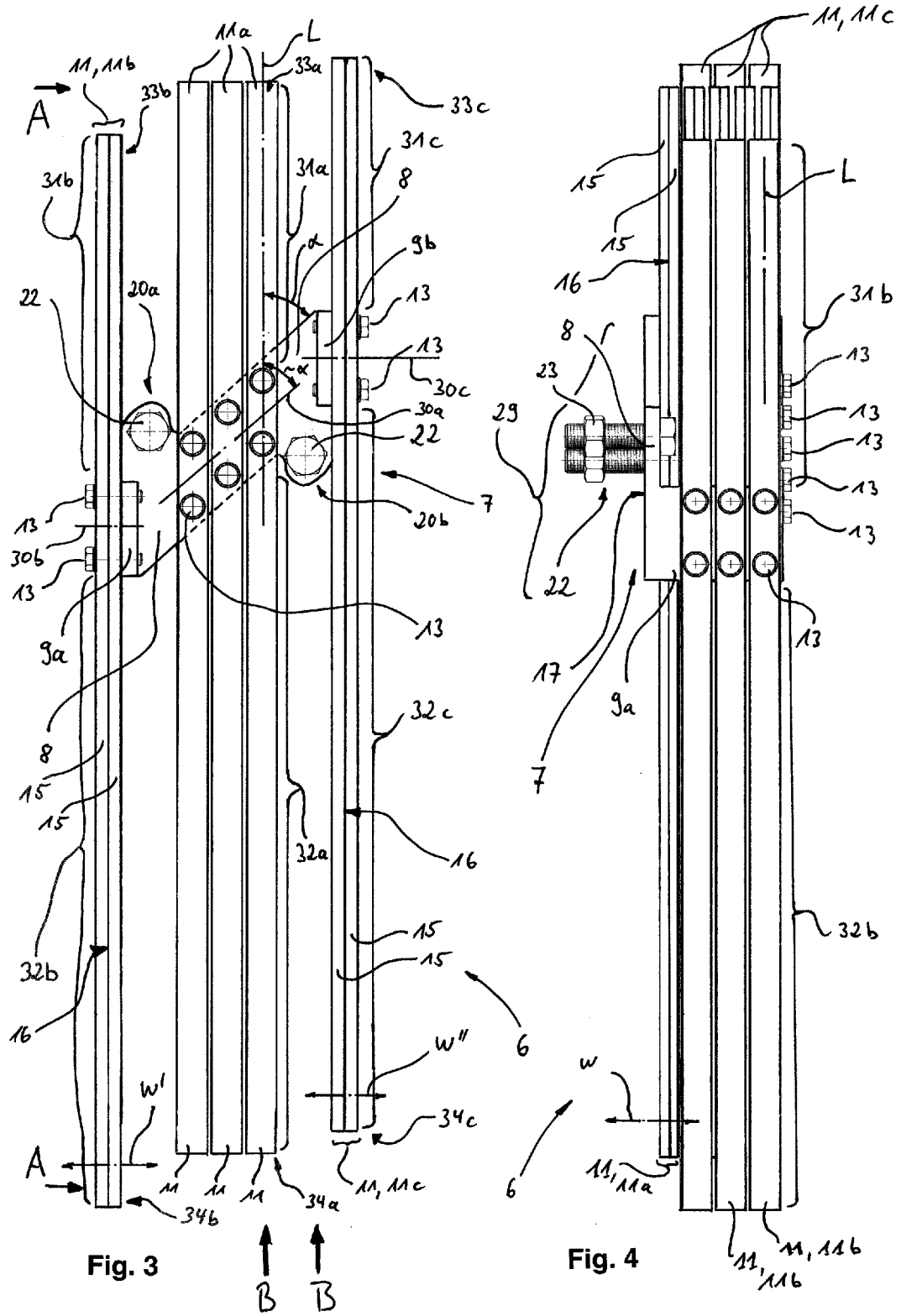

VIBRATION ABSORBER FOR DAMPING MECHANICAL VIBRATIONS

This application is a 35 U.S.C. §371 National Stage Application of PCT/EP2011/063087, filed on Jul. 29, 2011, which claims the benefit of priority to Serial No. DE 10 2010 038 720.7, filed on Jul. 30, 2010 in Germany, the disclosures of which are incorporated herein by reference in their entirety.

The present invention relates to a vibration absorber for damping mechanical vibrations.

Although the present invention can be applied for the purpose of damping mechanical vibrations to a wide range of structures which are capable of vibration at least in some portions, the invention is described in greater detail in the following in connection with the absorption of structure-borne sound which propagates as mechanical vibration within the supporting construction of a bridge structure.

Within supporting constructions such as steel bridge structures for railways, mechanical vibrations may be triggered and, consequently, low-frequency sound radiation may arise owing to the vibrating body of the construction, which sound radiation is also referred to as a drone in a specific frequency range. This drone is, however, often perceived by people to be unpleasant and disturbing. Thus, it would be desirable to damp as far as possible this type of low-frequency sound radiation originating from bridge structures, particularly where the structure is located in a densely populated area.

Resonance absorbers which are intended to reduce vibrations of a body to be damped and which operate according to the principle of rod-shaped vibrating elements which are fixed on either one or both sides were described, for example, in DE 21 63 798 C2. In order to cover a particular range of frequencies to be damped, a number of parallel rods of different lengths are provided, for example, and are each attached on one side to a frame. The resonance absorber in DE 21 63 798 C2 is attached with a non-positive fit to the body to be damped via the frame.

DE 43 43 008 C1 shows a resonance absorber for damping structure-borne vibrations, in which freely vibrating double tongues are provided, a damping lining being squeezed between the two elements of the tongue. In the case of the resonance absorber described therein, a number of tongues of varying lengths are arranged parallel to one another in a plurality of layers, the layers being separated from one another by spacers and held together by means of clamping screws on a base plate. The damping elements in the form of double tongues described in DE 43 43 008 C1 are, however, merely capable of effectively absorbing vibrations in a single direction of action, specifically normal to the plane, in which the tongues and the damping lining extend.

However, with the aforesaid bridge structures, it may be necessary to absorb or damp mechanical vibrations occurring in several directions in space. Furthermore, for effective vibration absorption, absorbers used to damp vibrations should be applied to points of the structure with high vibration dynamics. In this case, impairment of the function of the supporting construction of the structure, in particular an attenuation in the load-bearing capacity owing to measures for attaching the absorber, should be avoided for reasons of security. Furthermore, the weight which the vibration absorber(s) add(s) to structure must be below the maximum permitted static additional load, and the vibration absorbers should additionally be able to be accommodated in the installation space available, without impeding inspection and maintenance operations on the structure.

With the absorbers according to the above-mentioned prior art, it is often only possible to achieve a vibration damping which takes account of the aforesaid requirements with difficulty or at great cost.

The present invention thus addresses the object of providing a vibration absorber which allows effective absorption of vibrations along several directions in space and does not impair the safety and maintainability of the structure.

This object is achieved by a vibration absorber having the features of claim 1.

Said claim provides a vibration absorber for damping mechanical vibrations of a structure which is capable of vibration at least in some portions, comprising at least two rod-shaped vibrating elements which each have a longitudinal axis. Further provided is a support module comprising at least two non-parallel support plates and an attachment device. In this case, for the purpose of attaching the vibration absorber to the structure, the attachment device is constructed in such a way that mechanical vibrations of the structure can be passed into at least a first support plate. Furthermore, the support plates are interconnected in this case in such a way that the mechanical vibrations can be transferred from the first support plate to a second support plate. A first vibrating element is coupled at a first position along the longitudinal axis of the first vibrating element to the first support plate in order to transfer the mechanical vibrations from the first support plate to the first vibrating element. In addition, a second vibrating element is coupled at a second position along the longitudinal axis of the second vibrating element to the second support plate in order to transfer the mechanical vibrations from the second support plate to the second vibrating element.

The concept behind the present invention is that of initially passing the mechanical vibrations of the structure to be damped at least into the first support plate of the support module. In this case, the attachment device is suitably constructed. The mechanical vibrations are transferred from the first support plate to the second support plate. The coupling of the first vibrating element to the first support plate and the coupling of the second vibrating element to the second support plate, which is arranged such that it is not parallel to the first support plate and thus inclined with respect thereto, allow absorption of vibrations along two non-parallel directions in space and, in particular, along two directions in space which are orthogonal to one another. The fact that the support module is formed so as to have the two connected support plates means, in an advantageous manner, that the vibration absorber has low requirements in terms of installation space when it is attached at a selected point of the structure which is suitable for the purpose of vibration damping. At the same time, since a support module, as opposed to separate base plates, is attached to the structure, impairment of the load-bearing capacity of the structure owing to attachment measures is in this manner prevented or reduced to a minimum. Moreover, mounting and dismounting of the vibration absorber are simplified.

Further advantageous embodiments and developments of the invention emerge from the other dependent claims when viewed in conjunction with the figures of the drawing.

In one embodiment of the vibration absorber according to the invention, the first and second support plates are arranged substantially perpendicular to one another. This makes it possible, in a particularly suitable manner, for vibrations of the structure which is capable of vibration at least in some portions, which vibrations are passed into the first support plate, to be effectively absorbed along two directions in space which extend orthogonally to one another.

According to a development, the support module comprises a third support plate, which is connected to the first support plate in such a way that the mechanical vibrations can also be transferred from the first support plate to the third support plate. In this case, a third vibrating element is coupled at a third position along the longitudinal axis of the third vibrating element in order to transfer the mechanical vibrations from the third support plate to the third vibrating element. This allows the number of provided vibrating elements for damping the vibrations of the structure to be increased and, thus, more effective vibration absorption to be achieved owing to an enhancement of the energy removal by the vibrating elements.

In one embodiment, the first and third support plates are arranged substantially perpendicular to one another. As a result, the first vibrating element and the third vibrating element are likewise able, in a particularly effective manner, to absorb mechanical vibrations along two directions in space which extend perpendicular to one another.

In another embodiment of the vibration absorber according to the invention, the first support plate, the second support plate and the third support plate are arranged in a U-shape with respect to one another. In this case, the second and third support plates project from the same side of the first support plate. Owing to this feature, two-dimensional vibration damping is achieved in an especially space-saving manner and a vibration absorber which is easy to mount onto the structure is achieved.

In another embodiment, the second support plate and the third support plate are interconnected in the region of an open side of the U-shape via a connecting plate. As a result, the second and third support plates are able to be transported and handled together. Furthermore, a load-bearing, rigid connection of the first, second and third support plates is achieved.

According to a development, the coupling of the vibrating elements to the support plates is constructed in each case as a non-positive and moment-actuated screw connection. The screw connection occurs in particular by means of two screws in each case. The use of a non-positive and moment-actuated screw connection allows both simple and secure mounting and good replaceability of individual vibrating elements, and brings about calculable contact pressures and reliable transfer, in a manner entailing low losses, of the mechanical vibrations from the support plates to the vibrating elements which are each coupled to the support plates.

Another embodiment provides locking washers which prevent an unwanted autonomous loosening of the screw connections by means of which the vibrating elements are coupled to the support plates.

In an advantageous embodiment of the invention, the vibrating elements are arranged with respect to the support plates in such a way that a main direction of action of each of the vibrating elements extends substantially perpendicular to the support plate to which this vibrating element is coupled. As a result, each of the vibrating elements is able to damp mechanical vibrations in a direction which is perpendicular to the support plate to which the vibrating element in question is coupled. More effective damping of two-dimensional vibrations is thus achieved. At the same time, this embodiment allows the vibrating elements to be coupled to the respectively associated support plate in the same manner, thereby advantageously reducing the complexity of production and mounting.

In another embodiment, the position of the coupling of the vibrating elements to the support plate is selected in each case in such a way that each vibrating element forms two freely vibrating bars which are fixed on one side. Each of the vibrating elements thus forms two bar-shaped $\lambda/4$-absorber elements which remove energy from the system capable of vibration when shifting their fixed location by bending out of their idle position and which elements are thus able to damp vibration.

In another embodiment, a plurality of vibrating elements are coupled to at least one of the support plates. By providing a plurality of vibrating elements on at least one of the support plates, it is possible, with suitable adjustment of the lengths of the individual vibrating elements, to damp vibrations along the main direction of action of the vibrating elements, which are coupled to the at least one of the support plates, over a wider frequency range and/or, owing to the greater number of vibrating elements, to remove a greater amount of kinetic energy from the system capable of vibration.

In one embodiment, the plurality of vibrating elements are arranged side by side on the at least one of the support plates. In this case, in particular the main directions of action of the plurality of vibrating elements are aligned parallel to one another. This allows uninterrupted free vibration of the vibrating elements, together with a space-saving arrangement thereof, without individual vibrating elements colliding with one another.

In another embodiment, the plurality of vibrating elements are stacked in a plurality of layers along a direction which is perpendicular to the at least one support plate. In addition, the vibrating elements are in contact with spacing plates arranged between the vibrating elements. This reduces considerably the amount of space required by the entire module, the spacers ensuring that, in spite of the layered module, free vibration of the vibrating elements remains possible without the risk of collision.

According to a development of the vibration absorber according to the invention, each vibrating element is formed so as to have two tongues which are arranged substantially parallel to one another and have the same dimensions. In this case, a layer of a damping material, in particular a permanently resilient material, is arranged between the tongues. The removal of energy which is brought about by the vibrating element is enhanced by the layer of damping material, thereby improving the damping effect of the vibration absorber.

According to one embodiment, the vibrating elements are constructed for the purpose of removing kinetic energy of low-frequency vibrations, in particular in a frequency range of from 10 Hz to 200 Hz, from the structure which is capable of vibration at least in some portions.

In another development, the tongues of the vibrating elements are produced from a metal material.

In one embodiment a damping material which is resistant to ozone and UV-radiation is provided. This lengthens the service life of the vibration absorber, especially when used outside.

In another embodiment, the damping material is resistant to temperatures in a range of from $-20°$ C. to $+80°$ C. This also further improves the service life of the vibration absorber, particularly when the vibration absorber is used on structure which may heat up significantly under the influence of solar irradiance.

In a development of the vibration absorber according to the invention, the attachment device comprises a first planar contact face, which is provided on the first support plate, and one or more holes in one end portion or a plurality of end portions of the first support plate. In this case, the holes are constructed to accommodate attachment screws for non-positive and moment-actuated attachment of the support module by means of applying the first planar contact face to the structure. A planar contact face advantageously allows full-surface resting on an associated portion of the structure. The use of attachment screws for non-positive and moment-actuated attachment of the support module on the structure allows simple mounting and dismounting of the vibration absorber on the structure. Furthermore, the contact pressures of the first planar contact face on the structure, which are intended for reliable transfer of the vibrations from the structure to the first support plate, are able to be brought about by tightening the attachment screws with a predetermined torque. In this embodiment, it is possible, where necessary, to secure the screws in a simple manner against unintended autonomous loosening by means of suitable locking washers.

In another embodiment, the attachment device comprises a second planar contact face, which is provided on the second support plate. The second planar contact face is likewise provided for application to the structure. As a result, the overall surface area with which the support module is applied to the structure which is capable of vibration at least in some portions increases and the efficacy of the transfer of the vibrations from the structure to the support plates of the support modules is improved further.

In an advantageous embodiment, the attachment device comprises a tie rod and a clamping element. In this case, the clamping element is constructed for engaging behind at least part of a portion of the structure. Furthermore, in this embodiment, the tie rod can be coupled to the second support plate and the clamping element in such a way that a tensile force can be applied to the tie rod and that support module can hereby be clamped against the portion of the structure. By clamping the support module against a portion of the structure, the introduction of attachment holes and attachment threaded holes in the structure can be avoided at least in part. This is particularly advantageous where, for optimum vibration absorption, the vibration absorber is intended to be attached to the structure at a point at which the introduction of holes is not permitted on account of the mechanical load-bearing capacity of the structure at this point, or where the number of attachment holes introduced is intended to be kept to a minimum for this reason.

In one embodiment, a longitudinal axis of the tie rod extends substantially perpendicular to the first support plate. This advantageously makes it possible to achieve a particularly large contact pressure of the first support plate on the structure.

According to a development, the support plates are produced from metal. As a result, a robust and rigid support module can be produced.

According to another development, the support plates are constructed so as to be integrally connected. This allows a particularly good transfer of mechanical vibrations between the support plates to be achieved.

According to yet another development, the components of the vibration absorber which are formed using a metal are electroplated. This improves the resilience of these components against environmental influences, in particular against corrosion, to a considerable degree.

One embodiment of the vibration absorber according to the invention provides a retrieval basket which surrounds all the vibrating elements of the vibrating absorber in such a way that, in the event that the coupling of one of the vibrating elements to the associated support plate fails, for example owing to one of the attachment screws breaking, the affected vibrating element is caught within the retrieval basket. In this manner, it is possible to prevent, in particular when the vibration absorber is used on a bridge structure, the vibrating element from detaching itself from the bridge structure in the event that the coupling of the vibrating element to the associated support plate fails and from falling on objects, vehicles or people below.

Another embodiment provides an arrester cable which is connected to the structure and the support module. In this manner, in the—albeit highly unlikely—event that the attachment device fails, it is possible for the vibration absorber to be caught by means of the arrester cable and for a breakage of the entire vibration absorber to be prevented.

In the following, the present invention is described in more detail on the basis of embodiments with reference to the accompanying figures of the drawing, in which figures:

FIG. 3 is a plan view of a vibration absorber according to a second embodiment of the invention;

FIG. 4 is a side view of the vibration absorber according to FIG. 3, viewed in the direction A-A;

In the figures of the drawing, the same reference numerals denote like or operationally like elements and features, unless stated otherwise.

Figure 8:
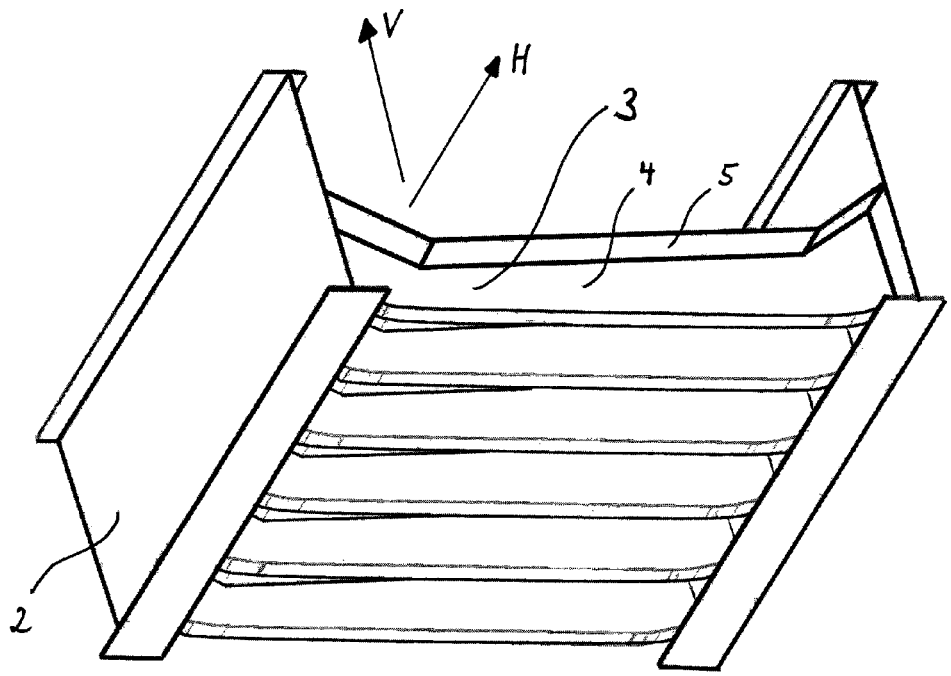
FIG. 8 shows an example of a supporting construction of a structure to which the vibration absorber according to the first, second or third embodiment is able to be applied in order to damp mechanical vibrations.

FIG. 8 is a simplified perspective view of a part of a supporting construction of a structure 1 which is capable of vibration at least in some portions. By way of example, this is a portion of a sub-construction of a railway bridge. It can be seen in FIG. 8 that the structure 1 comprises longitudinal girders 2, which extend substantially in parallel, and transverse girders 3 which are arranged between the longitudinal girders 2, are connected thereto and each have a web 4 and a flange 5. In order to reduce low-frequency sound radiation originating from railway bridges or, in other words, in order to "deaden the sound" of the structure 1, a vibration measurement is first carried out on the structure 1. The measuring results obtained over a certain period, for example a period of two to three days, are then analysed. In particular, the direction in space in which the structure is mechanically vibrating is established, as is the direction in space along which vibration damping should therefore occur and the frequency range which should preferably be damped. For example, vibration damping may prove necessary for vibrations along a horizontal direction H and a vertical direction V, as indicated in FIG. 8.

Figure 1:
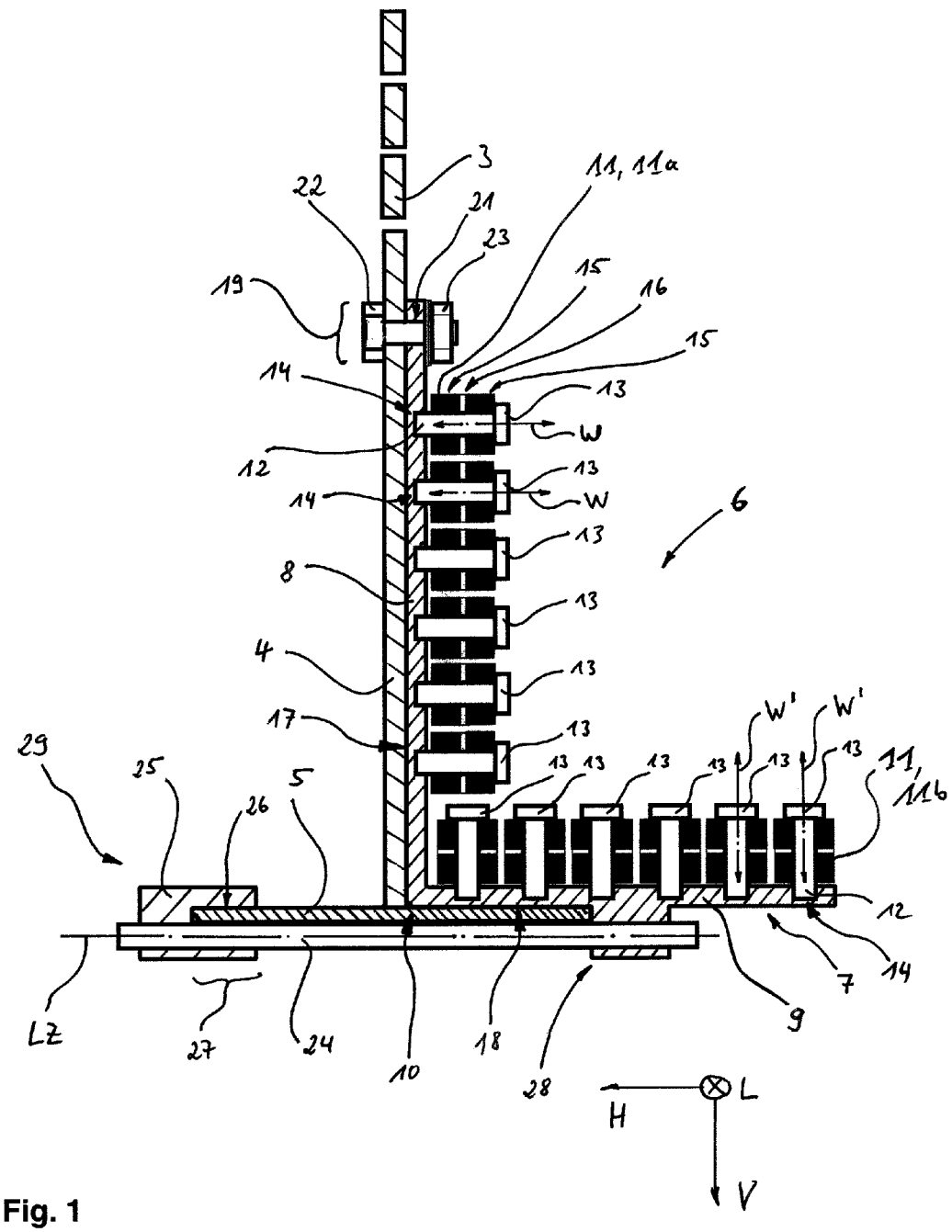
FIG. 1 shows a cross-section of a vibration absorber according to a first embodiment of the invention.

FIG. 1 shows the transverse girder 3 of the structure 1 in cross-section and a vibration absorber 6 according to a first embodiment of the invention. The cross-sectional girder 3 comprises a vertically extending web 4 and a horizontally extending flange 5. The vibration absorber 6 according to the first embodiment comprises a support module 7 which, for its part, comprises two support plates 8 and 9. The first support plate 8 and the second support plate 9 are arranged substantially parallel to one another and are interconnected in a corner region 10, preferably in an integral manner. In the state shown in FIG. 1, in which the vibration absorber 6 is already mounted on the transverse girder 3, the first support plate 8 extends in a vertical direction, substantially parallel to the web 4 of the transverse girder 3, whereas the second support plate 9 extends parallel to the flange 5 of the transverse girder 3.

The vibration absorber 6 further comprises a number of rod-shaped vibrating elements 11, a plurality of vibrating elements 11 being arranged on each of the support plates 8, 9. In other words, with the vibration absorber 6 in FIG. 1, a plurality of first vibrating elements 11a are coupled to the first support plate 8, whereas a plurality of second vibrating elements 11b are coupled to the second support plate 9. For illustrative purposes, only two vibrating elements are provided with reference numerals in FIG. 1. In the view in FIG. 1, the vibrating elements 11 are likewise shown in cross-section. The longitudinal axes L of the vibrating elements 11 extend substantially in parallel and extend into the plane of the drawing. The vibrating elements 11 are coupled in a non-positive and moment-actuated manner to the first and second support plates 8, 9 by means of a screw connection 12 in each case. As shown schematically in FIG. 1, each vibrating element 11 is provided with a hole which is arranged approximately in the centre of the cross-section and through which a threaded screw 13, for example having a hex head, is guided in each case. Each screw 13 engages with an associated threaded hole 14 in the first support plate 8 or the second support plate 9. By tightening the screw 13 with a specific, suitably selected torque, a non-positive and moment-actuated coupling of the vibrating elements 11 to the support plates 8, 9 is achieved. The first vibrating elements 11a are pressed onto the first support plate 8 with a contact pressure which is suitable for reliable transfer of vibrations. In the same way, the second vibrating elements 11b are likewise pressed onto the second support plate 9 with an adequate contact pressure.

As can also be inferred from FIG. 1, a plurality of vibrating elements 11a are coupled to the first support plate 8 in such a way that the main directions of action W of the vibrating elements 11a coupled to the first support plate 8 extend substantially parallel to one another and are substantially perpendicular to the first support plate 8 and to the web 4 of the transverse girder 3. By contrast, a plurality of vibrating elements 11b are likewise coupled to the second support plate 9, the main directions of action W' of the vibrating elements 11b coupled to the second support plate 9 for their part extending substantially parallel to one another. The main directions of action W' of the vibrating elements 11b coupled to the second support plates 9 are, however, perpendicular to the second support plate 9 and also substantially perpendicular to the flange 5 of the transverse girder 3.

Each of the vibrating elements 11 shown in FIG. 1, only two of which have been provided with reference numerals for a better overview, is formed so as to have two tongues 15 which are arranged parallel to one another and extend parallel to the longitudinal axis L of the vibrating elements 11, which longitudinal axis extends into the plane of the drawing. The tongues 15 have substantially the same dimensions and are, in particular, of the same thickness. A layer 16 of a damping material, in particular a permanently resilient material, is arranged between the tongues 15. The tongues 15 are preferably adhered to the layer 16 in such a way that, in the event of a bending of the vibrating elements 11, 11a, 11b which is produced when their free ends shift towards their main direction of action W or W', the damping material of the layer 16 is subjected to a shearing load. In this case, instances of internal friction in the layer 16 lead to enhanced energy removal.

In addition, FIG. 1 shows that a first planar contact face 17 is provided on the first support plate 8, which first planar contact face rests, in the mounted state shown, substantially via its entire surface on the web 4 of the transverse girder 3. Furthermore, the second support plate 9 comprises a second planar contact face 18 which, as likewise shown in FIG. 1, is provided in order to rest on the upper side of the flange 5 of the transverse girder 3 of the structure 1. A hole 21 is provided in an end portion 19 of the first support plate 8, through which hole the shank of an attachment screw 22 is guided. In the example shown in FIG. 1, the attachment screw 22 is constructed as a hexagon threaded screw by way of example. A hole is likewise introduced in the web 4 of the transverse girder 3 and is arranged concentrically with the hole 21 in the end portion 19 of the first support plate 8. The attachment screw 22 and an associated attachment nut 23 ensure, in the example shown, by applying a predetermined torque, which is adequate for the purpose, to the screw 22 and the nut 23, a non-positive and moment-actuated connection of the support module 7 to the structure 1 by means of the first planar contact face 17 resting on the web 4. In addition, the vibration absorber 6 shown in FIG. 1 provides a tie rod 24 which, as can be seen in FIG. 1, extends below the flange 5 and substantially parallel to the bottom thereof. Furthermore, a clamping element 25 comprising a slot 26 is provided. The slot 26 allows engagement behind part of a portion 27 of the structure, in this case a portion 27 of the end of the flange 5 of the transverse girder 3. A projection 28 is constructed on the second support plate 9. The tie rod 24 can be coupled to the projection 28 and the clamping element 25 in such a manner that a tensile force can be applied to the tie rod 24. For example, the projection 28 can be provided with a suitable threaded hole for this purpose. Furthermore, it is possible for the clamping element 25 to be provided with a through-hole, in order to draw said clamping element against the portion 27 of the flange 5 by means of the tie rod 24 and a nut (not shown) which can be screwed onto the tie rod 24, which is for example constructed as a threaded rod. In other words, the clamping element 25 is able to be tensioned against one of the ends of the flange 5 by means of the tie rod 24, whereas the support module 7, which is located on the opposite side of the transverse girder 3 with respect to the web 4, is pressed against the web 4 via the first planar contact face 17 and against the upper side of the flange 5 via the second planar contact face 18. In the embodiment shown in FIG. 1, the clamping element 25, the tie rod 24 and the projection 28 cooperate and replace some of the otherwise necessary attachment holes in the transverse girder 3. This makes it possible to advantageously minimise weakening of the transverse girder 3 and thus a reduction in its mechanical load-bearing capacity through the introduction of attachment holes. The tie rod 24, the clamping element 25, the projection 28, the first planar contact face 17, the hole 21 and the second planar contact face 18 form elements of an attachment device 29 for attaching the vibration absorber 6 to the structure 1. By means of the attachment device 29, the vibration absorber 6 can be attached to the structure 1, or, in the example shown, to the transverse girder 3 of the structure 1, in such a way that mechanical vibrations of the structure 1 are able to be passed into the first support plate 8 and, in particular, also into the second support plate 9. A longitudinal axis LZ of the tie rod 24 advantageously extends substantially perpendicular to the first support plate 8.

Figure 2:
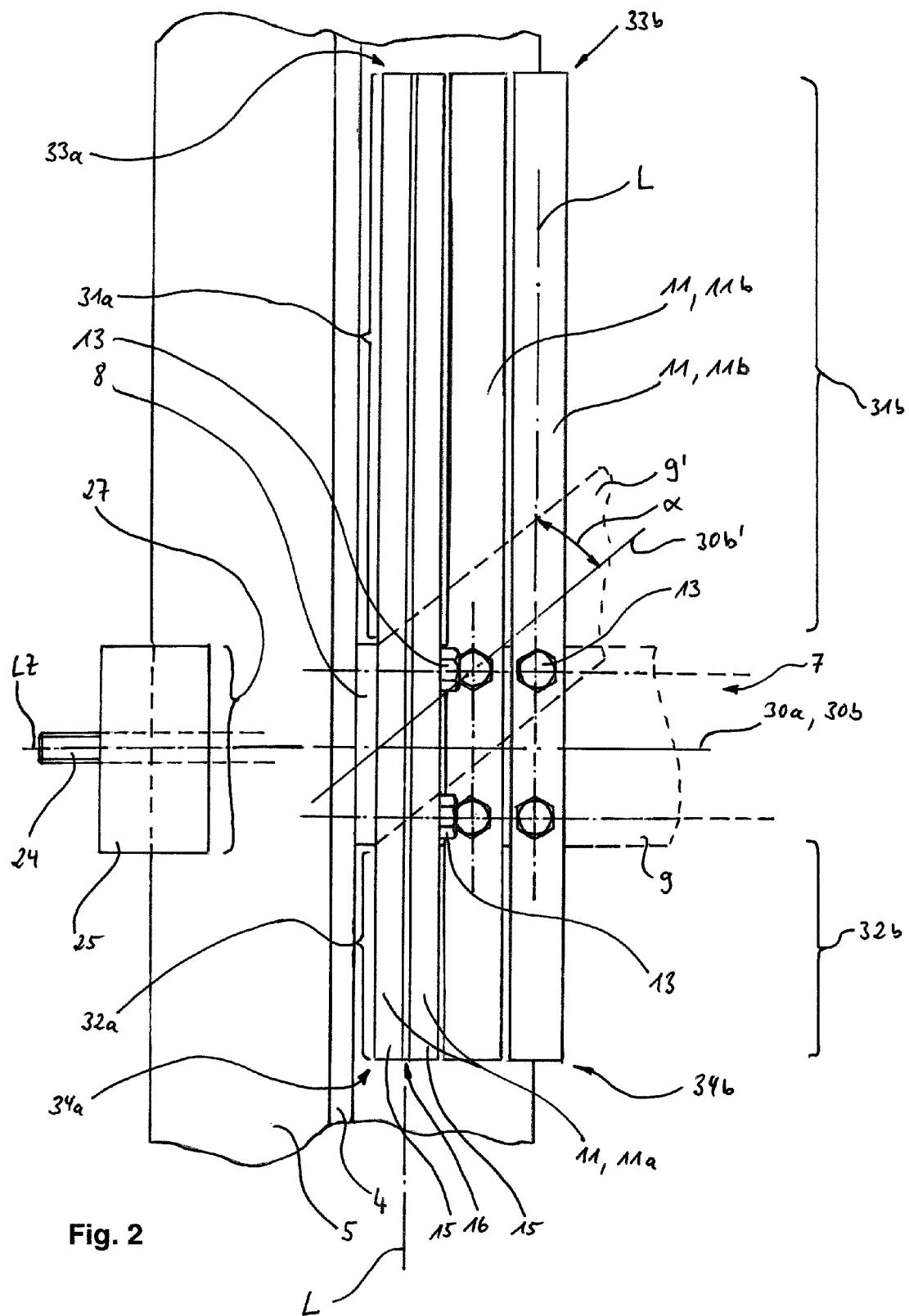
FIG. 2 is a plan view of the vibration absorber according to FIG. 1.

FIG. 2 is a plan view of the vibration absorber 6 according to the first embodiment, as shown in FIG. 1, and of a portion of the transverse girder 3 of the structure 1. Not all the vibrating elements 11 of the vibration absorber 6 in FIG. 1 are shown in FIG. 2. Yet, FIG. 2 also illustrates that each vibrating element 11 has a longitudinal direction L, the longitudinal directions L of the vibrating elements 11 being substantially parallel to one another. As FIG. 2 also shows, a first vibrating element 11a is coupled at a first position 30a along the longitudinal axis L of the first vibrating element 11a to the first support plate 8. This coupling is achieved in such a way as to allow transfer of mechanical vibrations from the first support plate 8 to the first vibrating element 11a. As already explained with reference to FIG. 1, in the embodiment shown, screws 13 are provided in order to produce a non-positive and moment-actuated screw connection 12 between the first vibrating element 11a and the first support plate 8. As FIG. 2 shows, the coupling of the first vibrating element 11a to the first support plate 8 is achieved by means of two screws 13, which are arranged on either side of the first position 30a. In the same way, a second vibrating element 11b is coupled at a second position 30b along the longitudinal axis L of the second vibrating element 11b, which second position, however, coincides in the first embodiment shown with the first position 30a, to the second support plate 9, in order to transfer mechanical vibrations from the second support plate 9 to the second vibrating element 11b. This coupling is also achieved by means of two screws 13, which are arranged symmetrically and on either side of the second position 30b along the longitudinal axis L.

As can be inferred from the overview of FIGS. 1 and 2, the support module 7 of the vibration absorber 6 according to the first embodiment is substantially L-shaped, which shape is formed by the two support plates 8 and 9. In FIG. 2, the further extension of the second support plate 9 is indicated in dashed lines. In a variant of the first embodiment, the second support plate 9 can also extend in a direction which is inclined at an angle α of less than 90° with respect to the longitudinal axis L of the second vibrating element 11b. The outline of the second support plate is denoted with the reference numeral 9' for this variant of the first embodiment of the vibration absorber 6.

FIG. 2 further shows that, owing to the selection of the first position 30a and of the second position 30b, each vibrating element 11 forms two freely vibrating bar elements 31a, 32a and 31b, 32b which are fixed on one side. In this case, the bar elements 31a, 31b, 32a, 32b are each rigidly fixed in the region of the adjacent screw 13 and are able to vibrate freely in the region of the free ends 33a, 33b, 34a, 34b. In the embodiment shown, the bar elements 31a and 32a or 31b and 32b differ in length. As indicated in FIG. 2, the lengths of the bar elements 31a, 31b, 32a, 32b of adjacent vibrating elements 11 may be equal or even, as in the variant 9' of the second support plate, vary from one vibrating element to the next owing to an adjustable position 30b and thus an adjustable position of the screws 13. Freely vibrating bar elements 31a, 31b, 32a, 32b of different lengths allow, with suitable selection of these lengths in conjunction with the dimensions of the tongues 15 and the thicknesses of the respective layers 16, vibration damping over a desired frequency range.

FIGS. 3 to 7 show a vibration absorber 6 according to a second embodiment of the invention, having a number of vibrating elements 11. The rod-shaped vibrating elements 11 are constructed in the second embodiment of the vibration absorber 6 in the same manner as in the first embodiment, meaning that reference can be made in this regard to the above explanations.

FIG. 3 is a plan view of the vibration absorber 6 according to the second embodiment. According to the second embodiment, the support module 7 comprises, as in the first example, in addition to a first support plate 8 and a second support plate 9a, a third support plate 9b. The second support plate 9a and the third support plate 9b are connected to the first support plate 8 in such a way that the mechanical vibrations are able to be transferred from the first support plate 8 to the second support plate 9a and also to the third support plate 9b. In the second embodiment, too, the support plates 8, 9a and 9b are preferably constructed so as to be integral with one another. Whereas, as in the first embodiment, first vibrating elements 11a are coupled to the first support plate 8 and second vibrating elements 11b are coupled to the second support plate 9a, at least a third vibrating element 11c is additionally coupled at a third position 30c along the longitudinal axis L of the third vibrating element 11c to the third support plate 9b, for the purpose of reliable transfer of mechanical vibrations. In the embodiment shown, three third vibrating elements 11c are shown by way of example. In the embodiment according to FIG. 3, too, the coupling of the vibrating elements 11 to the support plates 8, 9a, 9b is achieved in a non-positive and moment-actuated manner by means of screws, as already described. The longitudinal axes L of the vibrating elements 11 are also substantially parallel to one another in the second embodiment.

As can be seen in FIGS. 3 to 7, the second support plate 9a is arranged substantially perpendicular to the first support plate 8. In addition, the first support plate 8 and the third support plate 9b are likewise arranged substantially perpendicular to one another. All the vibrating elements 11 are of substantially the same length according the embodiment in FIG. 3, it also being possible to use vibrating elements 11 of different lengths. Whereas, in the embodiment in FIG. 3, the first support plate 8 extends so as to be inclined at an angle α of less than 90°, for example of approximately 45°, with respect to the longitudinal direction L of the vibrating elements 11, the screws 13, by means of which the vibrating elements 11a coupled to the first support plate 8 are attached in a non-positive and moment-actuated manner to the first support plate 8, are likewise arranged so as to be offset along a direction which is inclined about an angle α of less than 90°, in particular of approximately 45°, with respect to the longitudinal direction L. In this manner, the vibrating elements 11a which are located side by side and coupled to the first support plate 8 form bar elements 31a, 32a of different lengths, which lengths are graduated in a specific ratio, thereby rendering it possible for vibrations to be absorbed over a broad frequency range.

As FIG. 3 further shows, the first support plate 8 is provided with holes in the region of the two end portions 20a, 20b, which are constructed in the second embodiment of the invention in a tab-like manner, which holes are used to accommodate the attachment screws 22 for non-positive and moment-actuated attachment of the support module 7 to the structure 1.

FIG. 4 is a side view of the vibration absorber 6 according to the second embodiment. As FIG. 4 shows, the vibrating elements 11b and 11c coupled to the second support plate 9a and to the third support plate 9b, respectively, are each coupled to the corresponding support plate in such a way that vibrating elements 11 which are arranged side by side form bar elements 31a-c, 32a-c of equal length.

Figure 5:
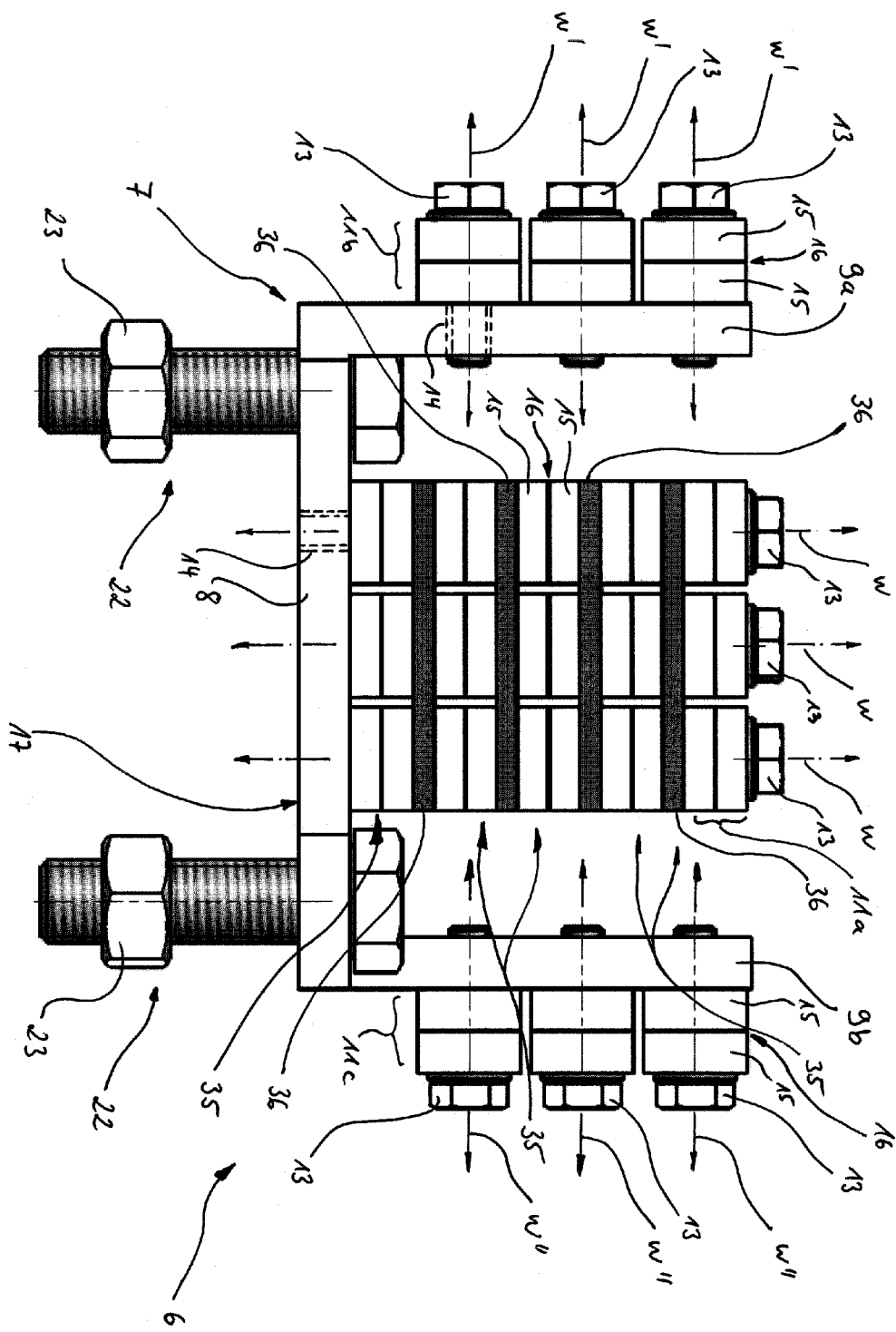
FIG. 5 is a front view of the vibration absorber according to FIG. 3, viewed in the direction B-B.

FIG. 5 is a front view of the vibration absorber 6 according to the second embodiment, viewed in the direction B-B (FIG. 3). It can be seen that the first support plate 8, the second support plate 9a and the third support plate 9b are, when viewed in this direction, arranged in a U-shape with respect to one another, the second support plate 9a and the third support plate 9b projecting from the same side of the first support plate 8. Furthermore, FIG. 5 shows that, in this embodiment, the vibrating elements 11b and 11c coupled to the second and third support plates 9a, 9b, respectively, are arranged on the lateral faces of the second and third support plates 9a, 9b, respectively, which face away from the interior of the U. The second vibrating elements 11b coupled to the second support plate 9a are arranged side by side. The same applies to the third vibrating elements 11c coupled to the third support plate 9b. In the second embodiment shown, a plurality of first vibrating elements 11a are likewise coupled to the first support plate 8. These first vibrating elements are stacked in a plurality of layers 35 along a direction which is perpendicular to the support plate 8. In the embodiment shown, three vibrating elements 11a per layer 35 are arranged side by side. To ensure unimpeded free vibration of the free ends 33a, 34a of the vibrating elements 11a, spacing plates 36 are provided between the vibrating elements 11a which are stacked in a plurality of layers 35. By means of the screws 13, the vibrating elements 11a are tensioned together with the spacing plates 36 against the first support plate 8, thereby ensuring reliable transfer of the vibrations from the first support plate 8 to the vibrating elements 11a. For overview purposes, only some of the vibrating elements have been provided with reference numerals.

It can additionally be seen in FIG. 5 that the first support plate 8 comprises, for its part, a first planar contact face 17. When attaching the vibration absorber 6 according to the second embodiment to the structure 1, the first contact face 17 rests on a surface of the structure 1, for example the surface of the web 4. The attachment screws 22 press the first contact face 17 against the surface of the structure 1, thereby ensuring good transfer of vibrations. In this embodiment, however, the second support plate 9a and the third support plate 9b do not have a contact face for resting on the structure 1.

Figure 6:
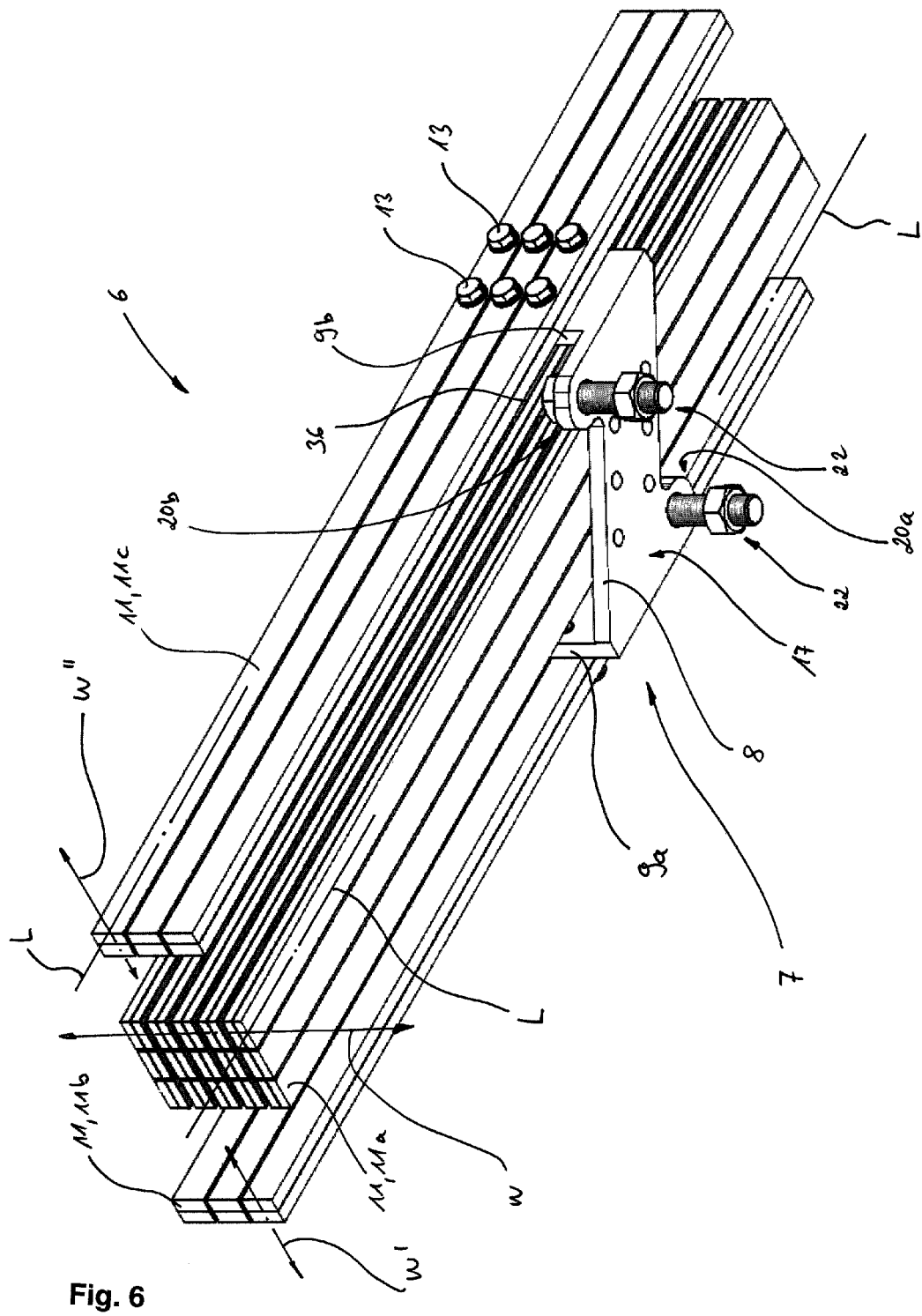
FIG. 6 is a perspective bottom view of the vibration absorber according to FIG. 3.
Figure 7:
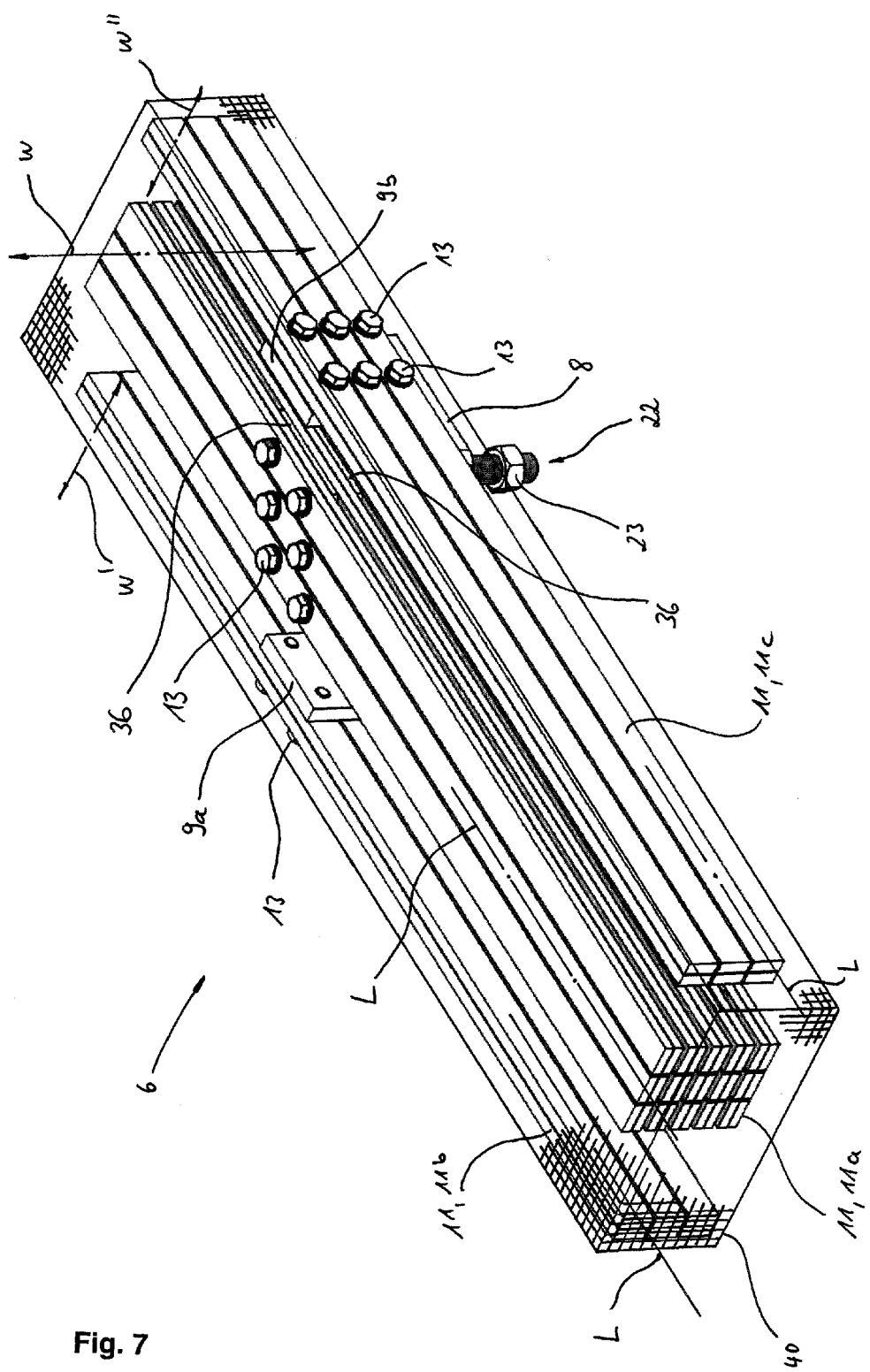
FIG. 7 is a perspective plan view of the vibration absorber according to FIG. 3, together with a retrieval basket.

FIGS. 6 and 7 are both perspective views of the vibration absorber 6 according to the second embodiment. The particularly favourable, space-saving arrangement of the vibrating elements 11 and the particularly favourable accessibility of the screw connections are evident in FIGS. 6 and 7.

Furthermore, FIG. 7 additionally also shows an optional retrieval basket 40, which surrounds all the vibrating elements 11 of the vibration absorber 6 in such a way that in the—albeit highly unlikely—event that one or more of the screws 13 breaks, any vibrating element 11 which, as a result, detaches itself from the support module 7 is caught safely. The retrieval basket 40 preferably engages around the vibration absorber 6 with a positive fit in some portions. As indicated in FIG. 7, the retrieval basket 40 comprises a wire-grid structure in this case, thereby also rendering it readily possible for the vibration absorber 6 to be visually inspected. Even if the retrieval basket 40 has been depicted here merely with respect to the second embodiment, said retrieval basket may, if provided with a suitable shape and suitable dimensions, also be used in the case of vibration absorbers 6 according to the first or third embodiment, which is described in the following.

Figure 9:
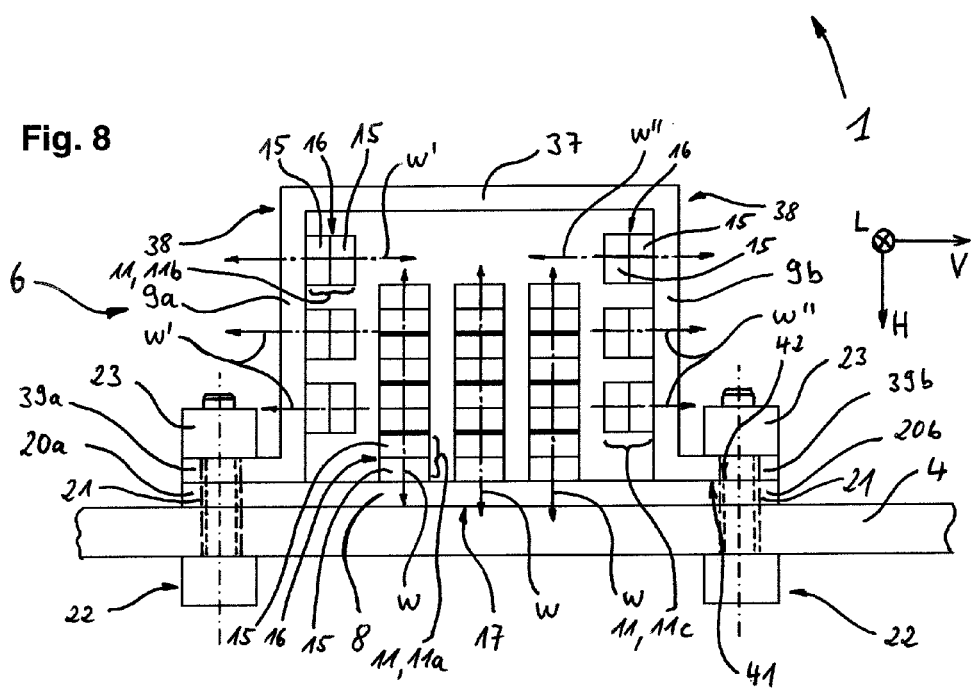
FIG. 9 is a schematic representation of a front view of a vibration absorber according to a third embodiment of the invention.

FIG. 9 shows a front view of a vibration absorber 6 according to a third embodiment of the invention, which vibration absorber likewise comprises vibrating element 11, 11a-c. The vibration absorber 6 according to the third embodiment constitutes a modification to the second embodiment.

In the third embodiment, a second support plate 9a and a third support plate 9b are integrally interconnected in corner regions 38 by means of a planar connecting plate 37 which is arranged substantially perpendicular to the second support plate 9a and to the third support plate 9b. In other words, the second support plate 9a, the connecting plate 37 and the third support plate 9b likewise form a U-shaped cross-sectional shape. A first support plate 8, which, for its part, comprises a first planar contact face 17 for application to a surface of a structure 1, for example to a surface of a transverse girder 3 of a railway bridge, is non-integrally connected in the third embodiment to the second and third support plates 9a, 9b. The first support plate 8 is constructed substantially planar and closes the U-shape formed by the support plates 9a, 9b and the connecting plate 37 at the side of said U-shape which remains open. Viewed differently, the connecting plate 37 connects the second support plate 9a and the third support plate 9b in the region of an open side of the U-shape formed by the first, second and third support plates 8, 9a, 9b.

In the case of the vibration absorber 6 in FIG. 9, too, the first support plate 8 can extend so as to be inclined with respect to the longitudinal direction L of the vibrating elements 11 at an angle α of less than 90°, for example of approximately 45°. The connecting plate 37 can extend substantially parallel to the first support plate 8 and likewise so as to be inclined about an angle α with respect to the longitudinal axis L.

In the vibration absorber 6 shown in FIG. 9, the vibrating elements 11, 11a-c are constructed in the same manner, as already described in relation to the first two embodiments, meaning that reference can be made to the relevant foregoing explanations. In the embodiment according to FIG. 9, too, spacing plates 36 (not shown here) may also be provided in order to ensure the free vibration of vibrating elements 11—the first vibrating elements 11a being shown here by way of example—which are stacked in layers. Attachment of the vibrating elements 11, 11a-c is also achieved in the third embodiment by means of screw connections 13, which, however, are not shown in detail in FIG. 9 for overview purposes. According to FIG. 9, the vibrating elements 11b, 11c are arranged side by side on the faces of the second support plate 9a and of the third support plate 9b which face the interior of the U-shape. As can be seen in FIG. 9, the vibrating elements 11 are thus enclosed transverse to the longitudinal direction L of the vibrating elements 11 by the support module formed by the first support plate 8, the second and third support plates 9a and 9b and the connecting plate 37.

In the case of the vibration absorber 6 in FIG. 9, the connection of the first support plate 8 to the second and third support plates 9a, 9b is achieved by means of a non-positive and moment-actuated screw connection. For this purpose, two lateral tabs 39a, 39b are provided, which are both arranged so as to project outwardly from the side of either the second support plate 9a or the third support plate 9b in a preferably perpendicular manner. The lateral tabs 39a, 39b both comprise a substantially planar lower surface 41.

For the purpose of mounting the vibration absorber 6 according to FIG. 9, a number of attachment holes are first introduced in the part of the structure 1 at which the vibration absorber 6 is intended to be attached. In the example shown, the web 4 of the transverse girder 3 is provided with attachment holes. Thereafter, attachment screws 22 coming from one side of the web 4 are inserted through the holes and, originating from the other side of the web 4, the first support plate 8, which, in end portions 20a, 20b, likewise comprises suitable holes 21 for accommodating the attachment screws 22, is fitted via the first contact face 17 to the surface of the web 4. The attachment screws 22 thus pass through the associated holes 21 in the end portions 20a and 20b. Thereafter, in a second step, the support plates 9a, 9b, which are integrally connected to one another and to the connecting plate 37, are fitted, together with the vibrating elements 11b, 11c coupled thereto. In this process, the lower surfaces 41 of the tabs 39a, 39b are rested on an upper surface 42 of the first support plate 8, in the region of the end portions 20a, 20b in each case. The lateral tabs 39a, 39b likewise comprise holes through which the attachment screws 22 are guided. Ultimately, by means of attachment nuts 23, a non-positive and moment-actuated connection of the first support plate 8 to the second and third support plates 9a, 9b is produced and, at the same time, a non-positive and moment-actuated connection of the vibration absorber 6 to the web 4 and a pressing of the first contact face 17 against said web is achieved for the purpose of good transfer of mechanical vibrations.

Owing to the two-part construction of the support module 7, the vibration absorber 6 according to FIG. 9 advantageously allows mounting by a single person, even if the vibration absorber 6 as a whole is heavy, for example on account of a large number of necessary vibrating elements 11. Even if the web 4 extends in a perpendicular manner in the case of the structure 1, it is possible to first suspend the support plate 8 having the first vibrating elements 11a on the penetrating attachment screws 22. Only in a second step is the second part of the support module 7 then, as described, fitted with the remaining vibrating elements 11b, 11c. The mass of the vibration absorber 6 is thus split into two lighter parts, which can be handled more readily still.

Furthermore, FIGS. 1 to 7 and 9 show the main directions of action W, W', W" of the first, second and third vibrating elements 11a, 11b and 11c, respectively, to provide an illustration for all three of the embodiments described. It can be seen that the vibration absorbers 6 according to the first, second and third embodiment of the invention allow vibrations to be damped along two mutually parallel directions in space.

In the two embodiments shown according to FIGS. 1 to 7 and 9, described above, the tongues 15 of the vibrating elements 11 are preferably produced from metal. The support plates 8, 9 (or 9') and 8, 9a, 9b are likewise preferably produced from a metal material and are, in the first and second embodiment, preferably integrally formed with one another. In the third embodiment, the second and third support plates 9a, 9b and the connecting plate 37 are preferably integrally formed with one another and together with the lateral tabs 39a, 39b. This makes it possible to ensure a high mechanical load-bearing capacity and a good service life. Preferably, the surfaces of the metal components of the vibration absorber according to the first, second and third embodiment are additionally electroplated, thereby ensuring improved resistance with respect to environmental influences.

The vibration absorber 6 according to the first, second and third embodiment comprises vibrating elements 11 which, in particular, allow effective absorption of low frequency vibrations in a frequency range of approximately 10 Hz to approximately 200 Hz. In all embodiments, a damping layer 16 is provided between the tongues 15, the damping material forming this layer 16 preferably being resistant to ozone and UV radiation and enduring temperatures in a range of −20° C. to 80° C., in particular, without damage.

Although, in the foregoing, the invention was described with reference to preferred embodiments, it is not restricted thereto, but may be amended in many ways without departing from the subject matter of the present invention.

In particular, it is conceivable for the attachment device to be constructed, for attachment of the vibration absorber, in such a way that the support module is able to be connected to a portion of the structure by welding.

LIST OF REFERENCE NUMERALS

1 Structure
2 Longitudinal girder
3 Transverse girder
4 Web
5 Flange
6 Vibration absorber
7 Support module
8 First support plate
9, 9a Second support plate
9' Second support plate (variant)
9b Third support plate
10 Corner region
11 Vibrating element
11a First vibrating element
11b Second vibrating element
11c Third vibrating element
12 Screw connection
13 Screw
14 Threaded hole
15 Tongue
16 Layer (damping material)
17 First contact face
18 Second contact face
19 End portion (first support plate)
20a, b End portion (first support plate)
21 Hole
22 Attachment screw
23 Attachment nut
24 Tie rod
25 Clamping element
26 Slot
27 Portion
28 Projection
29 Attachment device
30a First position
30b Second position
30b' Second position (variant)
30c Third position
31a-c Bar element
32a-c Bar element
33a-c Free end
34a-c Free end
35 Layer (vibrating elements)
36 Spacing plate
37 Connecting plate
38 Corner region
39a, b Lateral tab
40 Retrieval basket
41 Lower surface (lateral tab)
42 Upper surface (first support plate)
V Vertical direction
H Horizontal direction
L Longitudinal axis (vibrating element)
LZ Longitudinal axis (tie rod)
W, W', W" Main direction of action
α Angle

The invention claimed is:
1. Vibration absorber for damping mechanical vibrations of a structure which is capable of vibration at least in some portions, comprising:
at least two rod-shaped vibrating elements, which each have a longitudinal axis, and
a support module comprising at least two non-parallel support plates and an attachment device,
wherein, for the purpose of attaching the vibration absorber to the structure, the attachment device is constructed in such a way that mechanical vibrations of the structure can be passed into at least a first of the support plates;

wherein the support plates are interconnected in such a way that the mechanical vibrations can be transferred from the first support plate to a second of the support plates;

wherein a first vibrating element is coupled at a first position along the longitudinal axis of the first vibrating element to the first support plate and a second vibrating element is coupled at a second position along the longitudinal axis of the second vibrating element to the second support plate in order to transfer the mechanical vibrations from the first support plate to the first vibrating element and from the second support plate to the second vibrating element; and wherein the attachment device comprises a first planar contact face, which is provided on the first support plate, and one or more holes in one end portion or a plurality of end portions of the first support plate, the holes being constructed to accommodate attachment screws for non-positive and moment-actuated attachment of the support module by means of applying the first planar contact face to the structure.

2. Vibration absorber according to claim 1, wherein the first and second support plates are arranged substantially perpendicular to one another.

3. Vibration absorber according to claim 1, wherein the support module comprises a third support plate, which is connected to the first support plate in such a way that the mechanical vibrations can be transferred from the first support plate to the third support plate, a third vibrating element being coupled at a third position along the longitudinal axis of the third vibrating element in order to transfer the mechanical vibrations from the third support plate to the third vibrating element.

4. Vibration absorber according to claim 3, wherein the first and third support plates are arranged substantially perpendicular to one another.

5. Vibration absorber according to claim 3, wherein the first, second and third support plates are arranged in a U-shape with respect to one another, the second and third support plates projecting from the same side of the first support plate.

6. Vibration absorber according to claim 5, wherein the second and third support plates are interconnected in the region of an open side of the U-shape via a connecting plate.

7. Vibration absorber according to claim 1, wherein the coupling of the vibrating elements to the support plates is constructed in each case as a non-positive and moment-actuated screw connection, in particular by means of two screws in each case.

8. Vibration absorber according to claim 1, wherein the vibrating elements are arranged with respect to the support plates in such a way that a main direction of action of each of the vibrating elements extends substantially perpendicular to the support plate to which this vibrating element is coupled.

9. Vibration absorber according to claim 1, wherein the position of the coupling of the vibrating elements to the support plate is selected in each case in such a way that each vibrating element forms two freely vibrating bars which are fixed on one side.

10. Vibration absorber according to claim 1, wherein a plurality of vibrating elements are coupled to at least one of the support plates.

11. Vibration absorber according to claim 10, wherein the plurality of vibrating elements are arranged side by side on the at least one of the support plates.

12. Vibration absorber according to claim 10, wherein the plurality of vibrating elements are stacked in a plurality of layers along a direction which is perpendicular to the at least one support plate and are in contact with spacing plates arranged between the vibrating elements.

13. Vibration absorber according to claim 1, wherein each vibrating element is formed so as to have two tongues which are arranged substantially parallel to one another and have the same dimensions, a layer of a damping material, in particular a permanently resilient material, being arranged between the tongues.

14. Vibration absorber according to claim 1, wherein the attachment device comprises a second planar contact face, which is provided on the second support plate, said second planar contact face being provided for application to the structure.

15. Vibration absorber according to claim 1, wherein the attachment element comprises a tie rod and a clamping element, the clamping element being constructed for engaging behind at least part of a portion of the structure and the tie rod being able to be coupled to the second support plate and the clamping element in such a way that a tensile force can be applied to the tie rod and that support module can hereby be clamped against the portion of the structure.

16. Vibration absorber according to claim 15, wherein a longitudinal axis of the tie rod extends substantially perpendicular to the first support plate.

* * * * *